US 7,954,372 B2

(12) United States Patent
Brath et al.

(10) Patent No.: US 7,954,372 B2
(45) Date of Patent: Jun. 7, 2011

(54) DIAGNOSIS OF PITCH AND LOAD DEFECTS

(75) Inventors: Per Brath, Randers NV (DK); Søren Dalsgaard, Hadsten (DK); Mogens Blanke, Farum (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/741,748

(22) PCT Filed: Nov. 7, 2008

(86) PCT No.: PCT/DK2008/000395
§ 371 (c)(1),
(2), (4) Date: Sep. 15, 2010

(87) PCT Pub. No.: WO2009/059606
PCT Pub. Date: May 14, 2009

(65) Prior Publication Data
US 2011/0001319 A1   Jan. 6, 2011

Related U.S. Application Data

(60) Provisional application No. 60/990,858, filed on Nov. 28, 2007.

(30) Foreign Application Priority Data

Nov. 7, 2007   (EP) .................................. 07120177

(51) Int. Cl.
*G01M 19/00* (2006.01)
*G01B 5/30* (2006.01)

(52) U.S. Cl. ................ 73/168; 73/760; 290/44

(58) Field of Classification Search ............. 73/168, 73/760–860; 290/44
See application file for complete search history.

(56) References Cited

U.S. PATENT DOCUMENTS

| | | | | | |
|---|---|---|---|---|---|
| 4,161,658 | A | * | 7/1979 | Patrick | 290/44 |
| 5,155,375 | A | * | 10/1992 | Holley | 290/44 |
| 5,564,899 | A | * | 10/1996 | Na | 416/28 |
| 5,694,317 | A | * | 12/1997 | Nakagami et al. | 701/50 |
| 6,856,041 | B2 | * | 2/2005 | Siebenthaler et al. | 290/44 |
| 6,940,186 | B2 | | 9/2005 | Weitkamp | |
| 7,160,083 | B2 | | 1/2007 | Pierce et al. | |
| 7,728,452 | B2 | * | 6/2010 | Arinaga et al. | 290/44 |
| 7,763,989 | B2 | * | 7/2010 | Kinzie et al. | 290/44 |
| 2004/0236538 | A1 | | 11/2004 | Wobben | |

(Continued)

FOREIGN PATENT DOCUMENTS

DE   19948194 A1   4/2001

(Continued)

OTHER PUBLICATIONS

Jeffries et al, "Experience with bicoherence of electrical power for condition monitoring of wind turbine blades", IEE Proc Vis Image Signal Process, vol. 145, No. 3, Jun. 1998.

(Continued)

*Primary Examiner* — Max Noori
(74) *Attorney, Agent, or Firm* — Wood, Herron & Evans, LLP

(57) ABSTRACT

The invention relates to a method, system and computer readable code for diagnosis of pitch and/or load defects of e.g. wind turbines as well as wind turbines using said diagnosis method and/or comprising said diagnosis system.

8 Claims, 5 Drawing Sheets

U.S. PATENT DOCUMENTS

| | | | |
|---|---|---|---|
| 2009/0295159 A1* | 12/2009 | Johnson et al. | 290/44 |
| 2010/0209245 A1* | 8/2010 | Migliori | 416/1 |
| 2010/0226772 A1* | 9/2010 | Deering | 416/1 |

FOREIGN PATENT DOCUMENTS

| | | | |
|---|---|---|---|
| EP | 0995904 | A2 | 4/2000 |
| WO | 2004074681 | A1 | 9/2004 |
| WO | 2007131489 | A1 | 11/2007 |
| WO | 2008081232 | A1 | 7/2008 |

OTHER PUBLICATIONS

European Patent Office, International Preliminary Report on Patentability issued in related International application No. PCT/DK2008/000395 dated Apr. 29, 2010.

European Patent Office, search report issued in related European Application No. 07120177.6 dated Nov. 5, 2008.

* cited by examiner

DIAGNOSIS OF PITCH AND LOAD DEFECTS

FIELD OF THE INVENTION

The invention relates to a method, system and computer readable code for diagnosis of pitch and/or load defects of e.g. wind turbines as well as wind turbines using said diagnosis method and/or comprising said diagnosis system.

BACKGROUND OF THE INVENTION

In the recent years wind power has become a quite attractive source of renewable energy and many wind turbines have been built all over the world. This increases the demand for better maintenance and monitoring of wind turbine components. Nowadays there are three schemes for component maintenance: breakdown maintenance; preventive maintenance based on the average component lifetime; and predictive maintenance based on monitoring the health of a component. However, with respect to the predictive maintenance strategy, there are some component faults, for example related to blades and associated sensors that are difficult to diagnose by the known methods and techniques, faults that can lead to worsened efficiency or to overload and shortened lifetime of the blades. Such faults do not necessarily result in a rapid breakdown, but are often noticed after a period of time, e.g. when the average yearly energy production of a wind turbine differs from the expected production.

Furthermore, some defects can only be detected with existing methods, but the component giving rise to the defect cannot be isolated without human intervention.

Thus a new method and a system are needed for diagnosis of blades and associated components. This is in particular the case for a wind turbine blade and associated sensors.

In view of the present invention there will be given hereunder some definitions of the most used terms in this patent application. However, these term definitions should not be limiting to the present invention and any other appropriate and/or suitable term definition(s) should be possible to use.

The pitch angle $\theta$ is defined by the angle between the blade root chord and the rotor rotational plane. A pitch rotation is a rotation of the blade along its longitudinal axis.

The azimuth angle $\delta$ is defined by the angular position of the rotor as the (front view) clockwise or anticlockwise angle between current angular position of the blade, e.g. the first blade (blade No. 1, B1), and the vertical down.

The blade load is the torque experienced by the blade due to different forces acting on the whole or parts of the blade.

A pitch reference angle $\theta_{ref}$ is the desired value of the pitch angle $\theta$ and an azimuth reference angle $\delta_{ref}$ is the desired value of the azimuth angle $\delta$.

SUMMARY OF THE INVENTION

The method described here is a predictive maintenance strategy, but due to the nature of the faults and the invention, fault handling can be done without human intervention.

The present invention allows the pitch and/or load faults of the blade and/or sensors to be diagnosed with a sufficient accuracy and in time to prevent that a fault develops into failure.

Wind turbines with controlled blade angle (pitch) have a sensor for the blade angle which is called a pitch sensor. If this sensor has a fault, the pitch of the concerned wind turbine blade will be incorrect. A pitch sensor fault (for example pitch gain fault or pitch offset) will lead to the above-mentioned problems and disadvantages.

A load sensor can be used in the wind turbine blade in order to measure the load on the single blade as it is known that load on wind turbine blades is decisive for the lifetime of the blades and for the wind turbine efficiency. A load sensor fault (for example load gain fault or load offset) will also lead to problems and disadvantages by making the measurement nearly useless.

The present invention makes use of load and pitch measurements.

It may be seen as one object of the present invention to provide a method and a system for diagnosis of a possible fault or faults with pitch and load measurements, as well as a computer readable code on a computer readable or useable medium adapted to perform said method.

It may be seen as another object of the present invention to provide a wind turbine wherein said method and/or system is/are used.

Preferably, the invention alleviates, mitigates or eliminates one or more of the above-mentioned or other disadvantages singly or in any combination.

In particular, it may be seen as an object of the invention to provide a solution to said disadvantages.

In one aspect of the present invention there is provided a method for diagnosis of at least one possible fault in a blade and/or its associated sensor(s), the method comprising the following steps:
  making load and pitch measurements at a set of azimuth angles and/or a set of pitch reference angles;
  deriving relation between the measurements of loads and pitch angles; and
  comparing said load-pitch or pitch-load relation with the expected load-pitch or pitch-load relation in order to determine whether at least one possible fault with the blade and/or its associated sensor(s) is present.

In another aspect of the present invention there is provided a method for diagnosis of at least one possible fault associated with pitch and/or load in a blade and/or its associated sensor(s), the method comprising the steps of:
a) making load and pitch measurements by using any one or both of the following two procedures:
  i) running a pitch cycle and measuring the load, and then repeating the pitch cycle measuring steps at one or more azimuth angles, and/or
  ii) running an azimuth cycle and measuring the load, and then repeating the azimuth cycle measuring steps at one or more pitch reference angles;
b) deriving a relation between the measurements of loads and pitch angles; and
c) comparing said load-pitch or pitch-load relation with an expected or reference load-pitch or pitch-load relation in order to determine whether at least one possible fault with the blade and/or the blade sensors is present.

The diagnosis process according to the invention can consist of several actions as for example detection and isolation of a fault and, if possible, also estimation of its magnitude.

The main features of the present invention are described in the independent claims.

Additional features of the invention are presented in the dependent claims.

In general by writing that "it is an advantage" by the present invention and referring to an advantage, it must be understood that this advantage may be seen as a possible advantage provided by the invention, but it may also be understood that the invention is particularly, but not exclusively, advantageous for obtaining the described advantage.

In general the various aspects and advantages of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

The invention teaches a method and a system for diagnosis of gain and/or offset faults in pitch and load measurements on blades. The invention allows not only detecting faults in the sensors, but also detecting defect(s) in mounting the blade. It uses only flap wise load measurements and uses a predefined sequence of pitch (blade angle) and azimuth (rotor position) references to diagnose the faults. The faults can be diagnosed even with simultaneous gain and offset faults on both pitch and load. The active diagnosis is made at low or zero wind speed(s) while the turbine is not producing. The analysis of the data sequence is not necessarily done in the time domain, but can be made as a function of pitch and azimuth angles, which enables the sequence collecting data at different times according to prevailing conditions.

Pitch measurement offset on a wind turbine blade will result in the controller stabilizing the blade position at erroneous pitch. This changes the aerodynamic performance of that particular blade and will result in decreased annual production and different deviation in load behavior from what is expected. This measurement fault is characterized by being low in severity and intuitively difficult to diagnose. If a closed loop is reconfigured no performance degradation is experienced.

To enable total reconfiguration, precise pitch and load faults estimation must be made using turbine measurements. The fault should be diagnosed such that no manual inspection or manual measurement would be needed.

Figure 1A:
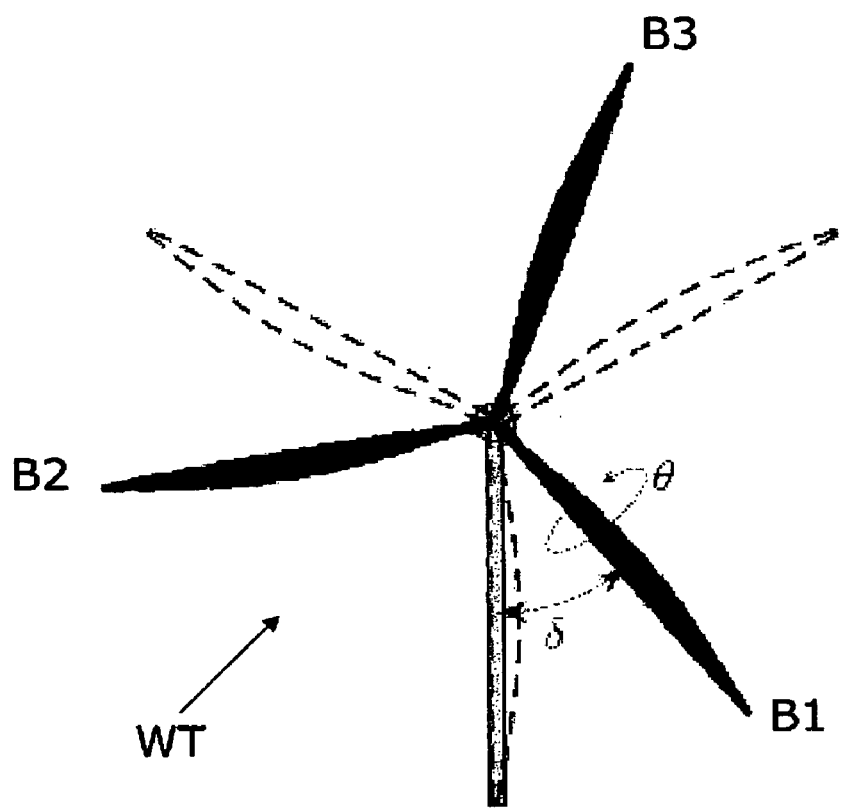
FIGS. 1a and 1b show a wind turbine with blades and sensors that are to be diagnosed and a cross section of one of them, also illustrating the pitch and azimuth angles.

FIG. 1a shows a wind turbine WT, according to the present invention, comprising (note that some of the components are not shown):
 a rotor,
 at least one wind turbine blade B1, B2, B3, where said at least one wind turbine blade B1, B2, B3 extends from the rotor for rotating the rotor to assume various azimuth angles $\delta$ when subjected to wind and/or the rotor may be rotated by a powered rotor rotation means, and at least part of said at least one wind turbine blade B1, B2, B3 is provided with blade rotating means for rotating at least part of said at least one wind turbine blade B1, B2, B3 to assume various pitch angles $\theta$,
 load measurement means for measuring the load on said at least one wind turbine blade B1, B2, B3 due to gravity and/or due to wind subjected to said at least one wind turbine blade B1, B2, B3,
 pitch angle measurement means for measuring the pitch angle $\theta$ of at least part of said at least one wind turbine blade, and
 means for controlling adjustment of the pitch angle $\theta$ of said at least part of the wind turbine blade.

Computational means for estimation of the magnitude of the fault(s) and/or computational means for accommodation of the fault(s) can be used.

Furthermore, in another possible embodiment, the rotor can be adjusted to assume one or more azimuth angles $\delta$. The azimuth angle is made available for the computational methods by measurement or otherwise.

In another possible embodiment, the rotor is not adjusted and the azimuth angle is made available for the computational methods by measurement or otherwise.

In another possible embodiment the rotor rotation means may comprise a bearing where rotation is provided by the wind and the rotation angle may be stopped by a brake, and/or may comprise an electrical or hydraulic motor and/or a gearing between.

In yet another possible embodiment the blade rotating means may comprise a bearing positioned between the rotor and the wind turbine blade, and/or may comprise an electrical or hydraulic motor and/or a gearing between.

The load measurement means can be provided in the wind turbine blade or at a position in the rotor where the wind turbine blade is connected to the rotor.

In yet another possible embodiment the load measurement means may be a strain gage and/or be provided by light being emitted and received and hereby a deflection of the wind turbine blade and load on the blade can be calculated. However, any other suitable load measurement means or types can be used and the invention should not be limited to the ones mentioned above.

The pitch angle measurement means may be provided by a vicinity sensor, an angular sensing means or any other suitable measurement means. However, any other suitable pitch angle measurement means or types can be used and the invention should not be limited to the above-mentioned.

The diagnosis system can comprise at least one processor for various calculations, etc., for example in connection with the mathematical methods and/or algorithms used for diagnosis of said at least one possible fault, and/or in connection with the calculation of said expected or reference load-pitch or pitch-load relation, and/or in connection with the isolation and/or magnitude estimation and/or accommodation of the load and/or pitch fault(s).

Figure 1B:
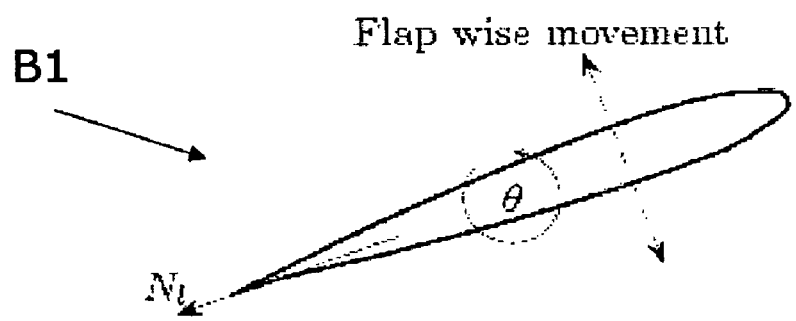

The three blades B1, B2, B3 shown on FIG. 1a and/or the blade sensors are to be diagnosed using the method of the present invention. The dotted position of the blades indicates an azimuth angle equal to zero degrees)($\delta=0°$). The wind turbine construction is not limited to three blades B1, B2, B3. Lower or higher number of blades can also be used. FIG. 1b shows a blade cross section of the blade B1, the cross section having a pitch $\theta$, a flap wise load torque $N_l$ and a flap wise movement (shown with dotted lines/arrows).

The diagnosis method and system according to the present invention are based on a blade model that is most accurate when the following conditions are met:
 No significant aerodynamic forces acting on the blade B1, B2, B3 hence low or zero wind speed(s); and/or Stationary rotor conditions.

Models that include relations between wind speed and power produced by a turbine are found in practice to be too uncertain to give useful results when the objective is to isolate pitch and/or load defects and estimate the magnitude of pitch and/or load faults.

Figure 2:
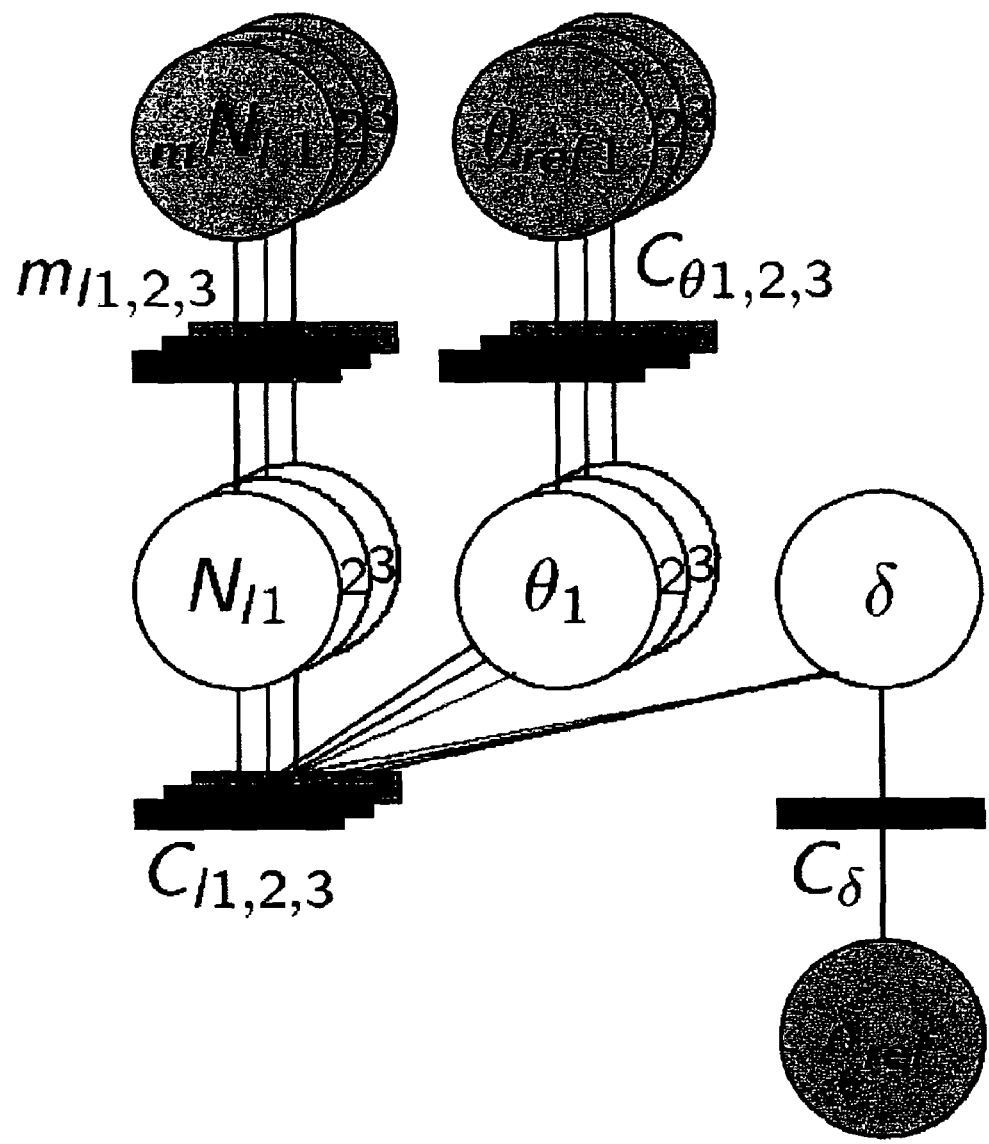
FIG. 2 shows the blade load structure in zero wind stationary conditions according to the present invention.
Figure 3A:
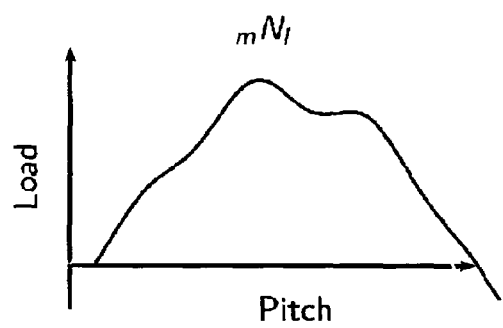
FIGS. 3a, 3b, 3c and 3d show how the measured pitch and load change with respect to the expected pitch and load when the system experiences a pitch offset (3a), load offset (3b), load gain fault (3c) or pitch gain fault (3d)
Figure 3B:
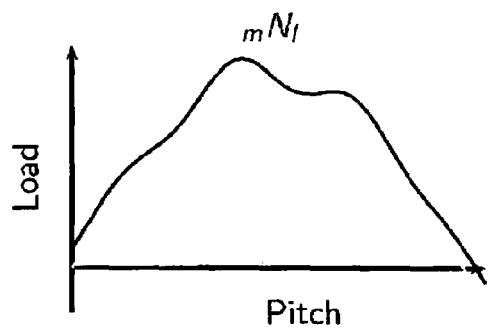
Figure 3C:
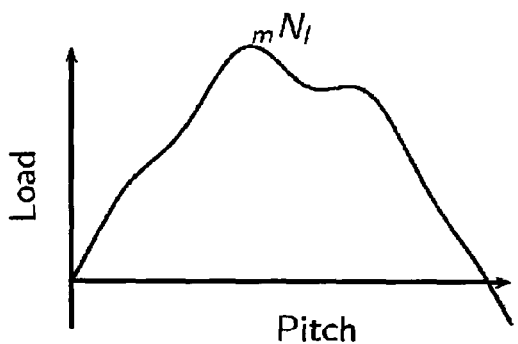
Figure 3D:
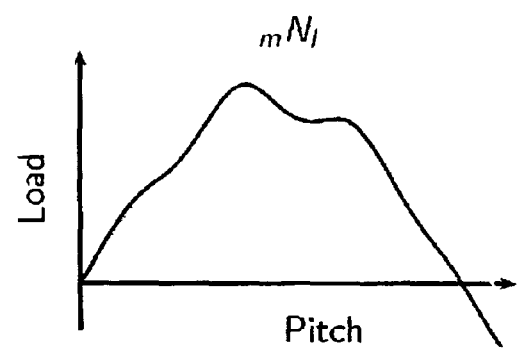

The second requirement is often a result of low wind speed. When aerodynamic load is insignificant, the gravitational load is the only load affecting the blade B1, B2, B3. This gives a structure of the set of equations (constraints) that describe normal behavior between variables as shown in FIG. 2, where black boxes indicate constraints and circles indicate variables. Known variables, such as measurements and reference values, are shown with gray background. With i=1, 2 or 3, FIG. 2 illustrates that load torque on a blade $N_{li}$ depends on blade pitch $\theta_l$ and azimuth angle $\delta$ through constraint $C_{li}$, referred to as the load model. A measurement of the load $_mN_{li}$ is related to the physical load $N_{li}$ through constraint $m_{li}$, referred to as a measurement constraint. The inputs to the system are the pitch references $\theta_{ref,i}$ that control pitch through constraint $C_{\theta i}$. The azimuth angle $\delta$ is controlled to match a set point $\delta_{ref}$ by a closed loop, described as constraint $C_\delta$. Note that no assumptions are made on how pitch and load are measured (type of sensors, etc.). No assumptions are made as to how pitch and azimuth angles are controlled, only that they track the reference in steady state provided no faults are present.

Analysis of the mathematical model of blades and associated sensors shows that load and/or pitch faults are detectable, but not isolable using conventional methods from fault detection and isolation theory.

With I denoting the set of isolable and D the set of detectable faults (violations of constraints), $$I=\{C_\delta\}$$

$$D_1=\{m_{l1}, C_{\theta 1}, C_{l1}\}$$

$$D_2=\{m_{l2}, C_{\theta 2}, C_{l2}\}$$

$$D_3=\{m_{l3}, C_{\theta 3}, C_{l3}\} \quad (1)$$

These blocks of isolable and detectable faults are what a passive diagnosis system can achieve. A fault in the azimuth actuator $C_\delta$ can be isolated, but the rest are detectable in sets, i.e. faults in any of the relations $\{m_{li}, C_{\theta i}, C_{li}\}$, where i=1, 2 or 3, will only be detectable. The term "passive diagnosis system" means that no system input is changed by the diagnosis system. A passive diagnosis system can only verify the consistency of the closed loop, but not change the behavior and/or references. However, if the diagnosis is allowed to slightly change or pertubate the input, it is possible to split some of the detectable blocks into smaller blocks (or even make the constraints isolable). This is the concept of active fault isolation. The described model (zero wind and stationary wind turbine) is of special interest with respect to active fault isolation. When the model is valid, active fault isolation can be performed without affecting the turbine production.

In the structural model of FIG. 2, it is seen that the path from input(s) to output, from $\theta_{ref}$ and $\delta_{ref}$ to $_mN_l$, are different. The path $\theta_{ref} \rightarrow _mN_l$ is $\{C_\theta, C_l, m_l\}$. The path from $\delta_{ref} \rightarrow _mN_l$ is $\{C_\delta, C_l, m_l\}$. As these are different, there could exist a possibility to isolate faults in constraints if the inputs are given different reference signals or either of the reference signals are given a perturbation. This is referred to as active fault isolation.

In order to evaluate this result by a detailed analysis, let the load measurement be given by:

$$_mN_l = g_l(\delta, \theta) + f_{N_l} = f_A g_l(\delta_{ref}, \theta_{ref} - f_\theta) + f_{N_l} \quad (2)$$

where a load model $g_l$ is dependent on azimuth angle and pitch angle, $f_A$ is a gain fault in load measurement, $f_{N_l}$ is an offset in load or an offset in the load sensor, $f_\theta$ is an offset in pitch angle or in the pitch sensor. The extension to include pitch gain fault is simple, but for simplicity it is not included here. The sensitivity in measured load to either of the three faults in equation 2, is given by the sensitivities:

$$\frac{\partial _mN_l}{\partial f_\theta} = f_A \frac{\partial}{\partial f_\theta} g_l(\delta_{ref}, \theta_{ref} + f_\theta) \quad (3a)$$

$$\frac{\partial _mN_l}{\partial f_{N_l}} = 1 \quad (3b)$$

$$\frac{\partial _mN_l}{\partial f_A} = g_l(\delta_{ref}, \theta_{ref} + f_\theta) \quad (3c)$$

From the above equations 3a, 3b and 3c it is clear that all three faults can be seen in the same output (none of the sensitivities are zero). More importantly the sensitivity of the pitch fault is dependent on the system input ($\delta_{ref}$ and $\theta_{ref}$) which enables active fault isolation. The load gain fault $f_A$ sensitivity is also dependent on the inputs, but not with the same analytical expression as $f_\theta$. All three faults might affect the same output with different sensitivities Eq. 3a, 3b and 3c. This makes active fault isolation possible.

The sensitivity toward pitch faults depends on the behavior (model) of the load, whereas a load measurement offset has unity sensitivity in the measured load. Assuming an accurate model, $g_l$, all three faults can be isolated with good accuracy, provided a suitable sequence of input signal perturbations can be determined.

With azimuth zero ($\delta=0$), the model of gravitational signal is not dependent on pitch gain and offset faults in addition to load gain fault. Therefore there is only load offset in this signal and thus it can easily be estimated in this position. However, load offset can also be estimated in azimuth positions different from 0. Therefore, it is not necessary to limit the present invention to this position ($\delta=0$) in the algorithm, but this position should not be excluded as a possibility.

Using residual based active isolation the same conclusion can be drawn. This can be seen from the residual expression:

$$R = _mN_l - g_l(\delta_{ref}, \theta_{ref}) \quad (4)$$

Because the term $g_l(\delta_{ref}, \theta_{ref})$ is the expected behavior it does not depend on faults. The measurement does depend on the faults in the way equation 2 describes. Because of this the sensitivities of R and $_mN_l$ are identical and the same conclusions can be drawn.

To summarize, the active fault setup can diagnose pitch and load faults, e.g. pitch and load measurement offsets and gain faults, in stationary close to zero wind conditions. The faults can be distinguished using the following procedures:

Procedure 1: Cycle pitch at different azimuth angles.
1) Set a desired (e.g. non-zero) azimuth angle $\delta_{ref}$ for the turbine blade that is to be diagnosed;
2) Run a pitch $\theta_{ref}$ cycle (for example from limit to limit) and measure the gravitational load in order to derive a pitch-load or load-pitch relation;
3) Run step 2) at different azimuth angles to increase robustness in fault estimates;
4) Compare the pitch-load or load-pitch relation with the expected pitch-load or load-pitch relation; and 5) Derive the pitch and/or load measurement faults (e.g. pitch gain or/and pitch offset fault(s) and/or load gain or/and load offset fault(s)) from the pitch-load or load-pitch data set(s).

Procedure 2: Cycle azimuth at different pitch angles.
1) Set a desired pitch $\theta_{ref}$ for the turbine blade that is to be diagnosed;
2) Run an azimuth $\delta_{ref}$ cycle (from limit to limit) and measure the gravitational load in order to derive a pitch-load or load-pitch relation;
3) Run 2) at different pitch angles to increase robustness in fault estimates;
4) Compare the pitch-load or load-pitch relation with the expected pitch-load or load-pitch relation; and
5) Derive the pitch and/or load measurement faults (e.g. pitch gain or/and pitch offset fault(s) and/or load gain or/and load offset fault(s)) from the pitch-load or load-pitch data set(s).

Procedure 3: Obtaining a data set of pitch and load measurements under simultaneous rotation in azimuth and change in pitch in order to obtain the data set(s) for analysis.

Either of these procedures may be seen as an object of the invention to find the pitch-load or load-pitch response.

Pitch and azimuth can be brought about by a feedback action (closed loop control) or by direct actuation without feedback (open loop).

The possible fault(s) can be at least one of: pitch gain fault, pitch offset fault, load offset fault, load gain fault, and/or other deviation from normal behavior of the blade and/or the sensor(s).

FIGS. 3a, 3b, 3c and 3d show respectively examples of pitch offset, load offset, pitch gain fault and load gain fault. On these four plots with light (thin) curves (lines) it is shown what is measured by the pitch and load measurement means and with dark (thick) curves (lines) it is shown what is expected.

Below it will be shown how pitch offset faults and load gain and offset can be estimated by using a rigid body model and the procedure described. However the invention is not limited to the rigid body model which is given only as an example. Any other suitable model and consequently any other suitable algorithm should be used with the present invention.

The usability of the active fault isolation will be illustrated using a rigid body gravity load. The flap wise gravity load behavior is:

$$_mN_l(\delta_{ref}, \theta_{ref}) = m_b l_b g \sin(\delta)\sin(\theta) + f_{N_l}$$
$$= f_A \overline{m}_b \overline{l}_b g \sin(\delta_{ref})\sin(\theta_{ref} + f_\theta) + f_{N_l} \quad (5)$$

where $m_b$ and $l_b$ are the actual blade mass and centre of mass, $\theta$ and $\delta$ are the actual pitch and azimuth angle respectively. A multiplicative fault $f_A$ is included when the nominal values ($\overline{m}_b$ and $\overline{l}_b$) are used. This gain fault represents faults in the $\overline{m}_b \overline{l}_b g$ term which can be interpreted as a load sensor gain fault. Furthermore, the load and pitch measurement offset faults are included.

The measurement signal has the following sensitivity toward pitch measurement offset:

$$\frac{\partial _m N_l}{\partial f_\theta} = f_A \overline{m}_b \overline{l}_b g \sin(\delta_{ref})\cos(\theta_{ref} - f_\theta) \quad (6)$$

where the dependency of pitch offset fault clearly vanishes when azimuth reference is set to zero ($\delta_{ref}=0$). This enables a direct reading of load measurement offset and the diagnosing procedures described above can be applied. The task of estimating the faults, after the diagnosing procedures are run, will be discussed below (this setup assumes no pitch gain fault).

The pitch reference can be varied from limit to limit, wherein the faults should be estimated. The gravity load is periodic (with respect to pitch) with a period of 360 degrees, but with unknown amplitude, phase and offset. Using sinusoidal fitting by exact linearization enables phase, offset and amplitude estimation. The load measurement is assumed to be:

$$_mN_l(nT)=A\sin(2\pi fnT+\phi)+N_0+v, n=1\ldots N \quad (7)$$

which is a sine with unknown amplitude (A), offset ($N_0$) and phase ($\phi$) but with know frequency (f). Measurement noise is ($v$). The equation can directly be expanded to:

$$_mN_l(nT)=A\cos(\phi)\sin(2\pi fnT)+A\sin(\phi)\cos(2\pi fnT)+N_0+v \quad (8)$$

which is linear with respect to $\lambda_1=A\cos(\phi)$, $\lambda_2=A\sin(\phi)$ and $\lambda_3=N_0$. These parameters can be estimated using linear regression:

$$\begin{bmatrix} _mN_l(1) \\ _mN_l(2) \\ \vdots \\ _mN_l(N) \end{bmatrix} = \begin{bmatrix} \sin(2\pi f 1T) & \cos(2\pi f 1T) & 1 \\ \sin(2\pi f 2T) & \cos(2\pi f 2T) & 1 \\ \vdots & \vdots & \vdots \\ \sin(2\pi f NT) & \cos(2\pi f NT) & 1 \end{bmatrix} \begin{bmatrix} \lambda_1 \\ \lambda_2 \\ \lambda_3 \end{bmatrix} + \begin{bmatrix} v_1 \\ v_2 \\ \vdots \\ v_N \end{bmatrix} \quad (9)$$

or $$_mN_l = \Phi\lambda + v$$

The least mean square error parameter solution is a solution to the linear least square problem and has the closed form solution:

$$\hat{\lambda}=(\Phi^T\Phi)^{-1}\Phi^T{}_mN_l \quad (10)$$

The phase can be estimated by:

$$\hat{\varphi} = \hat{f}_\theta = \tan^{-1}\left(\frac{\hat{\lambda}_2}{\hat{\lambda}_1}\right) \quad (11)$$

The pitch offset fault can directly by estimated by the phase, without calculating the model response phase because the model phase of the expected signal is zero. The load measurement offset fault can be estimated using this sinusoid fitting as well.

$$\hat{N}_0=\hat{f}_{N_l}=\hat{\lambda}_3 \quad (12)$$

Alternatively the load offset estimate from $\delta_{ref}=0$ can be verified by this sinusoid fitting. The signal amplitude can be estimated as well.

$$\hat{A}=\hat{f}_A\overline{m}_b\overline{l}_b g \sin(\delta_{ref})=\sqrt{\hat{\lambda}_1^2+\hat{\lambda}_2^2} \quad (13)$$

Note that the measurement gain error $f_A$ can be found from the amplitude estimate. When the measurements contain white noise the solution of (10) is the best least mean square error estimate with respect to $\hat{\lambda}$.

Using a residual based diagnosis (in stead of the output behavior treated above) results in a residual structure of:

$$R = m_b l_b \sin(\delta)\sin(\theta) - \overline{m}_b \overline{l}_b \sin(\delta_{ref})\sin(\theta_{ref}) \qquad (14)$$

$$= \overline{m}_b \overline{l}_b \sin(\delta_{ref})(f_A \cos(f_\theta)\sin(\theta_{ref}) + f_A \sin(f_\theta)\cos(\theta_{ref}) - \sin(\theta_{ref})) + f_{N_l} \qquad (15)$$

where the same regression analysis can be performed on the transformed response:

$$R + \sin(\theta_{ref})\overline{m}_b \overline{l}_b \sin(\delta_{ref}) \qquad (16)$$

The functionality of the algorithm can be verified by running a simulation with the following stationary response from references to load:

$$_m N_l = f_A \overline{m}_b g \overline{l}_b \sin(\delta_{ref})\sin(\theta_{ref} + f_\theta) + f_{N_l} + v$$

$$v \in N(\mu, \sigma) \qquad (17)$$

where $\overline{m}_b = 8000$ kg, $\overline{l}_b = 5$ m, $f_A = 1.05$, $f_\theta = 4°$, $f_{N_l} = 25$ kNm and measurement noise with zero mean and variance of $\sigma^2 = (10$ kNm$)^2$. The active isolation algorithm generates the pitch-load or load-pitch curves for series of azimuth angles. Each curve shows response at azimuth angles spanning from 0° to 90° in intervals of 10°.

At azimuth angle zero the algorithm can estimate the load offset of the load measurement as the mean value (when varying the pitch). Then the algorithm fits a sinusoid on the pitch-load or load-pitch curves generated at the set of azimuth angles, resulting in an azimuth dependent phase, amplitude and offset estimate. Only one azimuth angle is needed for fault diagnosis, but using a set of different angles will increase robustness of the method.

Figure 4A:
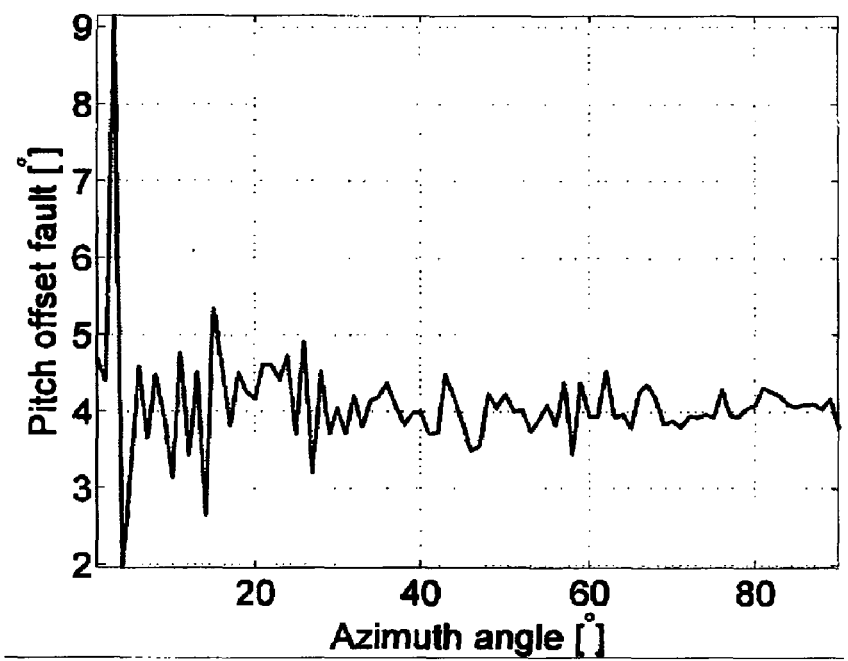
FIGS. 4a, 4b and 4c show the fault estimates from the active isolation algorithm.
Figure 4B:
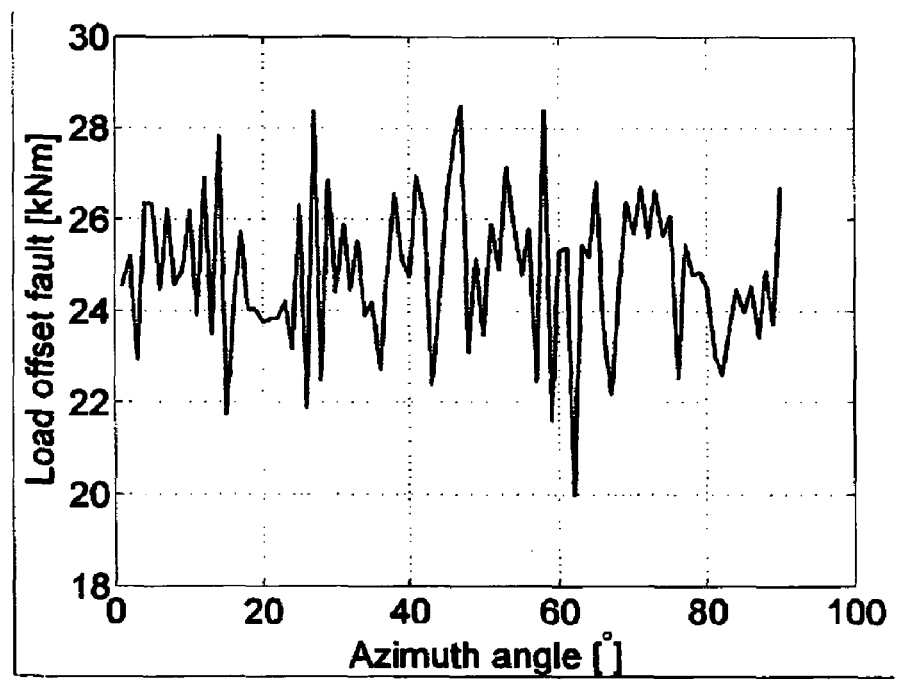
Figure 4C:
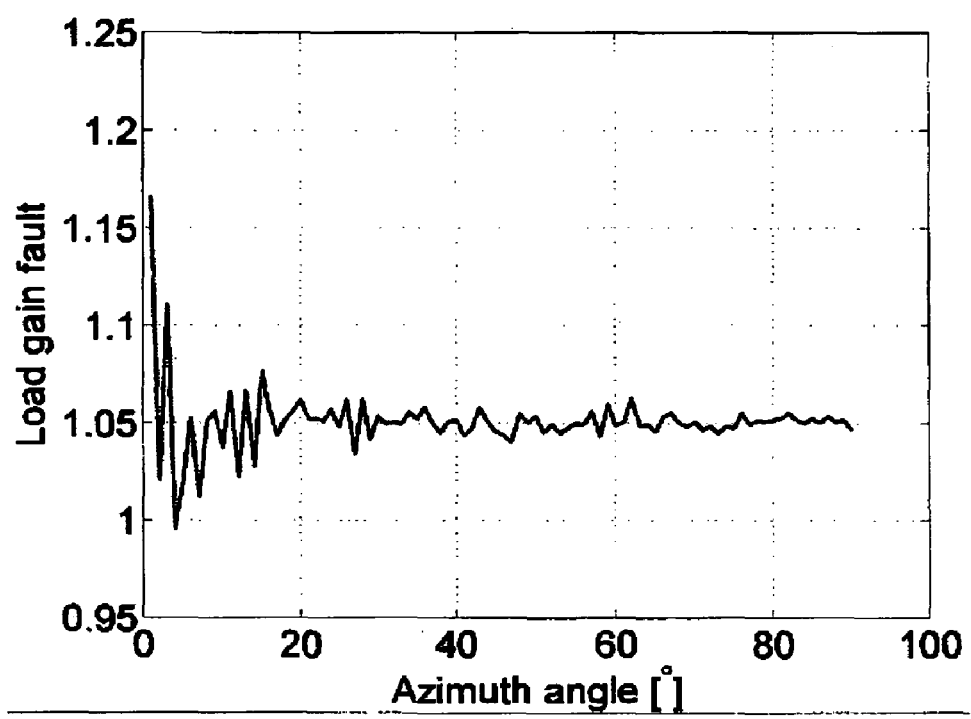

The fault estimate plots of the samples are shown in FIGS. 4a, 4b and 4c. FIG. 4b shows the load offset estimate which estimates well the 25 kNm offset. The measurement noise affects the load offset estimate, but shows no significant azimuth dependency. FIG. 4a shows the pitch offset estimate which at azimuth angles above 10° estimates well the 4° offset. The amplitude of the sine fitting corresponds to the term $f_A \overline{m}_b g \overline{l}_b \sin(\delta_{ref})$ and scaling the estimate by $(f_A \overline{m}_b g \overline{l}_b \sin(\delta_{ref}))^{-1}$ results in a precise fault estimate as shown on FIG. 4c. The plots are a function of azimuth angles and verify that no azimuth dependency is in the estimates.

It is noted that a special embodiment of the invention uses $\delta_{ref} = \delta$ and obtains the same results as described above.

Analytical considerations of the load behavior verified that a pitch offset and load gain and offset faults can be isolated using active isolation. Using the gravitational load for a rigid body, simulations have been carried out verifying these conclusions. A least mean square parameter estimate has been made to estimate pitch and load offset as well as load measurement gain fault. They were all diagnosable using the least mean square estimate and active isolation. This diagnostic procedure uses only measurements from one blade, hence the same approach can independently be used at the other turbine blades.

However the invention should not be limited to the simulation or algorithm described above, but the principle it is build on.

The procedure according to the present invention has been derived that can diagnose pitch offset using only load measurements corrupted by both load measurement offset and gain faults. The algorithm extension to diagnose pitch gain fault is easily done using a variable frequency sine fitting estimator algorithm.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practiced in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Reference signs are included in the claims; however, the inclusion of the reference signs is only for clarity reasons and should not be construed as limiting the scope of the claims.

NOMENCLATURE

| Latin Letters | | |
|---|---|---|
| Symbol | Description | Unit |
| A | Load amplitude | Nm |
| Â | Load amplitude estimate | Nm |
| Bn | n'th blade | |
| $C_{l,n}$ | Load constraint of blade n | — |
| $C_{\theta n}$ | Pitch actuator constraint of blade n | — |
| $C_\delta$ | Azimuth actuator constraint | — |
| $D_n$ | The $n^{th}$ set of detectable constraints | — |
| f | Pitch-load cycle frequency | 1/rad |
| $f_{Nl}$ | Load offset | Nm |
| $\hat{f}_{Nl}$ | Load offset estimate | Nm |
| $f_A$ | Load gain fault | — |
| $f_\theta$ | Pitch offset | rad |
| $\hat{f}_\theta$ | Pitch offset estimate | rad |
| g | Gravitational constant | N/kg |
| $g_l(\delta, \theta)$ | Load model | — |
| I | The set of isolable constraints | — |
| $l_b$ | Blade center of mass | m |
| $\bar{l}_b$ | Blade nominal center of mass | m |
| $m_b$ | Blade mass | kg |
| $\overline{m}_b$ | Blade nominal mass | kg |
| $m_{l,n}$ | Load torque measurement constraint of blade n | — |
| n | Index | — |
| $N_{(\mu, \sigma)}$ | Gaussian distributed number | |
| $N_0$ | The pitch-load relation offset | Nm |
| $\hat{N}_0$ | Estimate of pitch-load relation offset | Nm |
| $N_{l,n}$ | Blade n load torque | Nm |
| $_m N_{l,n}$ | Blade n load torque measurement | Nm |
| $_m N_l$ | Blade load torque measurement | Nm |
| R | Load residual | Nm |

-continued

| Latin Letters | | |
|---|---|---|
| Symbol | Description | Unit |
| T | Pitch sample interval | rad |
| v | Load measurement noise | Nm |
| Greek Letters | | |
| $\delta$ | Azimuth angle (rotor position angle) | rad |
| $\delta_{ref}$ | Azimuth angle reference (rotor position angle reference) | rad |
| $\lambda_n$ | The n'th linear parameter | — |
| $\hat{\lambda}_n$ | The n'th linear parameter estimate | — |
| $\hat{\lambda}$ | The linear parameter estimate | — |
| $\mu$ | Mean value | — |
| $\theta$ | Pitch (blade angle) | rad |
| $\theta_i$, i = 1, 2, 3 | Blade 1, 2 and 3 pitch (angle) | rad |
| $\theta_{ref1,2,3}$ | Blade 1, 2 and 3 pitch (angle) reference | rad |
| $\theta_{ref}$ | Pitch (angle) reference | rad |
| $\sigma$ | Standard deviation | — |
| $\phi$ | Pitch-load relation phase | rad |
| $\hat{\phi}$ | Pitch-load relation phase estimate | rad |
| $\Phi$ | Linear regression matrix | — |

The invention claimed is:

1. A method for diagnosis of blades and associated components, said method being characterized in that it is a method for diagnosis of at least one possible fault associated with pitch and/or load, the method comprising:
   a) making load and pitch measurements by using any one or both of the following two procedures:
      i) at a desired azimuth angle, measuring the load at a set of pitch angles ($\theta$), and/or
      ii) at a desired pitch angle, measuring the load at a set of azimuth ($\delta$) angles, and then repeating measuring the load at a set of azimuth ($\delta$) angles at one or more pitch reference angles ($\theta_{ref}$);
   b) deriving a relation between the measurements of loads and pitch angles; and
   c) comparing said load-pitch or pitch-load relation with an expected load-pitch or pitch-load relation in order to determine whether at least one possible fault with the blade (B1;B2;B3 . . . ) and/or the blade sensor(s) is present.

2. The method of claim 1, wherein procedure i) further comprises measuring the load at a set of pitch angles ($\theta$) at one or more azimuth angles ($\delta$).

3. The method of claim 1, wherein the measurements are made at low or zero wind speed(s).

4. The method of claim 1, wherein the measurements are made at stationary rotor conditions.

5. The method of claim 1, wherein said possible fault is at least one of: pitch gain fault, pitch offset fault, load offset fault, load gain fault, and/or other deviation from normal behaviour of the blade and/or the sensor(s).

6. The method of claim 1, wherein at least one mathematical method and/or algorithm is used for diagnosis of said at least one possible fault.

7. The method of claim 1, wherein the results are being used for diagnosis of the load and/or pitch fault(s), and/or for estimation of the magnitude of the fault(s) and/or for accommodation of the fault(s).

8. A computer readable and/or useable code on a computer readable and/or useable medium adapted to perform the method of claim 1.

* * * * *

UNITED STATES PATENT AND TRADEMARK OFFICE
CERTIFICATE OF CORRECTION

| | | |
|---|---|---|
| PATENT NO. | : 7,954,372 B2 | Page 1 of 1 |
| APPLICATION NO. | : 12/741748 | |
| DATED | : June 7, 2011 | |
| INVENTOR(S) | : Per Brath et al. | |

It is certified that error appears in the above-identified patent and that said Letters Patent is hereby corrected as shown below:

In the cover page:

In the second column, section (74) Attorney, Agent, or Firm, change "Evens" to --Evans--.

In the Specification:

At column 4, line number 57, change "degrees)" to --degrees--.

Signed and Sealed this
Ninth Day of August, 2011

David J. Kappos
*Director of the United States Patent and Trademark Office*